United States Patent [19]

Fujii et al.

[11] Patent Number: 4,462,667
[45] Date of Patent: Jul. 31, 1984

[54] CONTROL DEVICE FOR PERIODIC FLASH PHOTOGRAPHING

[75] Inventors: Akira Fujii, Osaka; Norio Beppu, Kyoto, both of Japan

[73] Assignee: Minolta Camera Kabushiki Kaisha, Osaka, Japan

[21] Appl. No.: 412,374

[22] Filed: Aug. 27, 1982

[30] Foreign Application Priority Data

Sep. 24, 1981 [JP] Japan .............. 56-141683[U]

[51] Int. Cl.³ .............. G03B 15/05; G03B 7/091; G03B 15/03
[52] U.S. Cl. .............. 354/137; 354/145.1; 354/267.1
[58] Field of Search .............. 354/32–35, 354/60 F, 145, 135, 137, 139, 149, 234, 267, 145.1, 149.1, 149.11, 267.1, 234.1

[56] References Cited

U.S. PATENT DOCUMENTS

| | | | |
|---|---|---|---|
| 3,593,637 | 7/1971 | Fahlewberg | 354/234 |
| 3,831,184 | 8/1974 | Morse | 354/267 X |
| 4,199,242 | 4/1980 | Hosomizu | 354/145 |
| 4,305,649 | 12/1981 | Nagaoka et al. | 354/139 |

FOREIGN PATENT DOCUMENTS 53116148 10/1978 Japan .
56-70534 6/1981 Japan .............. 354/267

Primary Examiner—L. T. Hix
Assistant Examiner—Douglas S. Lee
Attorney, Agent, or Firm—Watson Cole Grindle & Watson

[57] ABSTRACT

A control device for periodic flash photographies is provided with an actuation timing setting circuit in which actuation timings of a camera are manually set and a timer control circuit which generates a first signal at every set actuation timing and a second signal a given period of time before every set actuation timing. The first signal is applied to a camera release electromagnet of the camera for a camera release operation. The second signal is applied to a voltage booster circuit of an electronic flash device or an external power source for an electronic flash device, so that a control transistor of the voltage booster circuit is made conductive by the second signal to supply current to the base of an oscillation transistor of the voltage booster circuit for the oscillation thereof, whereby the voltage booster circuit generates a high voltage applied to a main capacitor of the electronic flash device for the charging thereof. The generation of the second signal may stop after every set actuation timing, e.g. at the time of closure of a synchronous switch of the camera for firing the electronic flash tube.

22 Claims, 4 Drawing Figures

CONTROL DEVICE FOR PERIODIC FLASH PHOTOGRAPHING

BACKGROUND OF THE INVENTION

1. Field of the Invention

The present invention relates to a control device which actuates a camera at predetermined times e.g. at desired hours, at desired intervals, or in a desired period, and which, in conjunction with the actuation of the camera, makes an electronic flash device ready for effecting flash firings for flash photographing in cooperation with the camera, thereby enabling periodic flash photographing such as effected for recording a plant's growth.

2. Description of the Prior Art

It is extremely important to restrict the current consumption as much as possible in making flash photographing periodically. Especially in the case when small dry cells or batteries such as alkaline or alkaline-manganese cells of the UM-3 type, are used for the power source of the electronic flash device, the batteries will be consumed in half a day at the longest if the voltage booster or DC-DC converter of the device is operated continuously, whereby it is impossible to make periodic flash photographing for as long a period such as several hours or one day. To cope with such inconvenience, a device proposed in a Japanese laid-open patent publication No. Sho 53-116148 is adapted to energize an electronic flash device for given periods before, on and after the times when the camera is to be actuated, and make the electronic flash device complete its preparation for flash firing, i.e. complete the charging of the main capacitor thereof before the time of the camera actuation. However, the proposed device is arranged so that a relay provided in the electronic flash device has its terminal connected in the power supply path to the booster circuit to energize and de-energize the latter through the terminals. The relay is energized by the power source of the electronic flash device and requires a large current of as much as several tens of milliamperes although the period of the energization of the relay is controlled by a control signal from a release control device. The large current is an unnecessary current consumption for the intrinsic operation of the electronic flash device. Additionally, to assemble such a relay within the electronic flash device makes the device cumbersome and is unfavourable considering the compactness of the device. Further, if the relay is to be replaced by a semiconductor element or circuit, a power transistor or transistors for high output power and having a large size must be used therein because a large current of as much as 10 amperes flows momentarily through the power supply path to the booster circuit, whereby even the adoption of such a semiconductor can not contribute to the compactness of the device.

In the aforementioned prior art device, the energization of the relay for the booster circuit is controlled through the terminal of another relay provided in the release control device. Accordingly, the release control device also requires an extra large current of as much as 10 milliamperes and is large in size.

SUMMARY OF THE INVENTION

An object of the present invention is to provide a control device which is free from the above described disadvantages of the prior art device and in which unnecessary current consumption is restricted as much as possible without use of a large size element such as a relay, for enabling preparation of flash photography in a short time before each camera actuation effected at intervals.

Another object of the present invention is to provide a combination for periodic flash photographing utilizing a control device having the above feature.

To accomplish these objects, a control device of the present invention includes actuation timing setting means in which actuation timings of a camera for periodic photographing operation are manually set. Time control means generates a first signal at every actuation timing set in the actuation timing setting means and a second signal a given period of time before every actuation timing set in the actuation timing setting means.

The first signal is applied by first signal applying means to an electromagnetic camera release means for the actuation thereof in first and second embodiments of the present invention; whereas the second signal is applied by second signal applying means to a voltage booster circuit of an electronic flash device in the first embodiment and to a voltage booster circuit of an external power source for an electronic flash device in the second embodiment. The voltage booster circuit to which the second signal is applied includes an oscillation transistor and a semiconductive switching element for controlling current supply to the base of the oscillation transistor. In response to the second signal the semiconductive switching element is switched to effect the current supply to the base of the oscillation transistor, which in turn starts oscillation so that the voltage booster circuit raises the voltage of a battery cell to generate a high voltage applied to a main capacitor of the electronic flash device for the charging thereof.

The generation of the second signal starts such that the charging of the main capacitor is completed at latest before firing of the electronic flash device, i.e., closure of a synchronous switch of the camera synchronous with full opening of a camera shutter.

According to the present invention, the operative and inoperative condition of the voltage booster circuit is controlled not by directly opening and closing the power supply path to the voltage booster circuit but by switching and unswitching the semiconductive switching element, and therefore the current for the control can be restricted to several milliamperes at the most thereby enabling little energy consumption of the battery cell and also enabling periodic flash photographing for a long time.

The above and other objects and features of the present invention will become more apparent from the following descriptions of preferred embodiments of the present invention taken in conjunction with the accompanying drawings.

DESCRIPTION OF THE PREFERRED EMBODIMENTS

Figure 1:
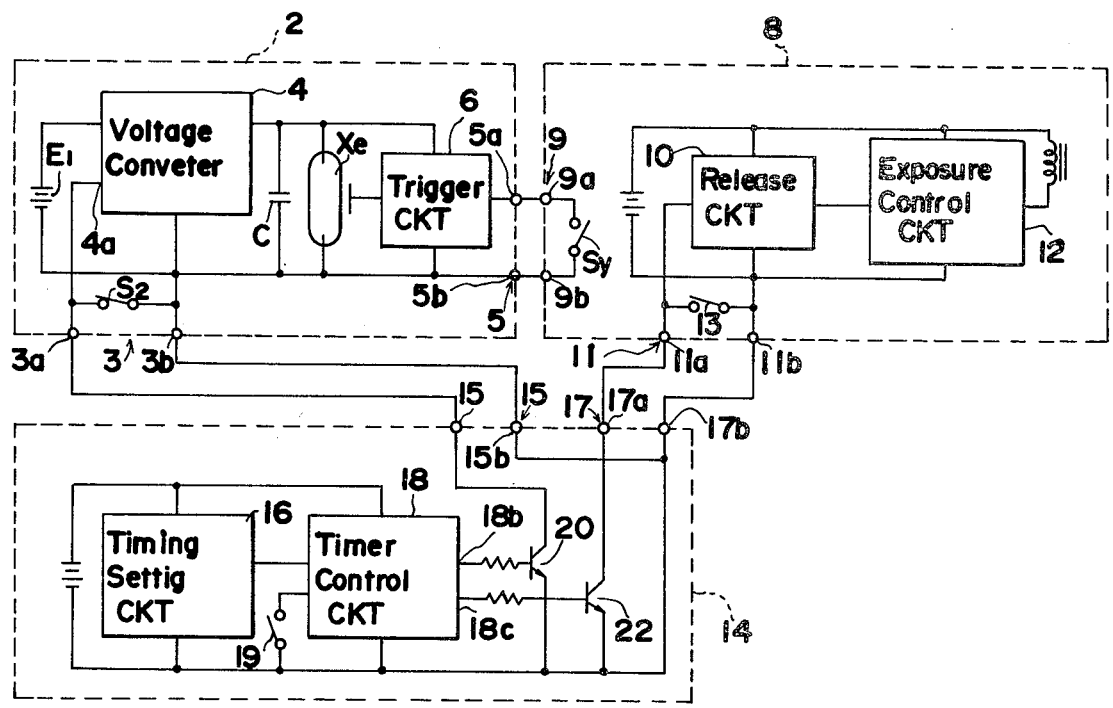
FIG. 1 is a block diagram showing the interrelationship of the electric connection between a camera, an electronic flash device and a release control device according to the present invention.

With reference to FIG. 1 which illustrates, by block diagram, the interrelationship between an electronic flash device and a camera release control device according to the present invention, and the interrelationship between a camera and the above two devices, electronic flash device 2 includes a DC power source E1, voltage booster converter circuit 4, main capacitor C, flash tube Xe, trigger circuit 6 and terminal sections 3 and 5.

Voltage booster circuit 4 is composed of a well-known DC-DC converter and raises the voltage of DC power source E1 consisting of small dry batteries of a relatively small capacity such as the UM-3 type alkaline battery, to a high voltage e.g. 300 volts required for the firing of flash tube Xe. Voltage booster circuit 4 is controlled to be operative and inoperative, in response to a control signal applied across input terminal 4a and the ground terminal through terminals 3a and 3b. Main capacitor C is charged by the output voltage of voltage booster circuit 4 to store electric energy for firing flash tube Xe. Trigger circuit 6 responds to a trigger signal supplied through terminals 5a and 5b in terminal section 5 to trigger and fire flash tube Xe in a manner as is well-known in the art.

Camera circuit 8 includes electromagnetic release circuit 10, exposure control circuit 12, synchronous switch Sy, and terminal sections 9 and 11. Electromagnetic release circuit 10 actuates a shutter release mechanism (not shown) in response to a release signal applied through terminals 11a and 11b in terminal section 11. Exposure control circuit 12 controls a camera diaphragm aperture and/or exposure time. Synchronous switch Sy is closed in synchronization with the full opening of the camera shutter with a trigger signal being generated by the closure of synchronous switch Sy. The signal thus generated is applied through terminal sections 9 and 5 to trigger circuit 6 of the electronic flash device.

Release control device 14 includes actuation timing setting circuit 16, timer control circuit 18, timer actuation switch 19 which is manually closed for actuating timer control circuit 18, transistors 20 and 22, and terminal sections 15 and 17. In actuation timing setting circuit 16, the timings of camera actuation such as hours or period at or with which the camera is actuated for its periodic operation, are set by a manual setting member (not shown). Timer control circuit 18 starts its time counting in response to the closure of switch 19 connected to input terminal 18a and produces first and second control signals at every actuation timing set in actuation timing setting circuit 16. At the set time, a first control signal of a "High" level pulse of a duration of, for example, 20 milliseconds, is at first generated at output terminal 18c and is applied, as a release signal, through transistor 22 and terminal sections 17 and 11 to electromagnetic release circuit 10 in camera 8. Then, for a given period extending from the time before that set time to the time after that time, for example from one minute before to one minute after that set time for the camera actuation, a second control signal of a lasting "High" level is generated at output terminal 18b and is applied, as signal for commanding preparation for flash photography, through transistor 20 and terminal sections 15 and 3 to input terminal 4a of voltage booster converter circuit 4 in electronic flash device 2. It should be understood that, of the above mentioned various timings, the commencement of the second control signal may be determined so that before the closure of synchronous switch Sy, main capacitor C has been charged by voltage booster circuit 4 which is being actuated by the second control signal, with an electric charge sufficient enough to fire flash tube Xe. Thus, the timing of the commencement of the second control signal may be determined in accordance with the characteristic of voltage booster converter circuit 4. The termination of the second control signal may be simultaneous with the closure of synchronous switch Sy.

Figure 2:
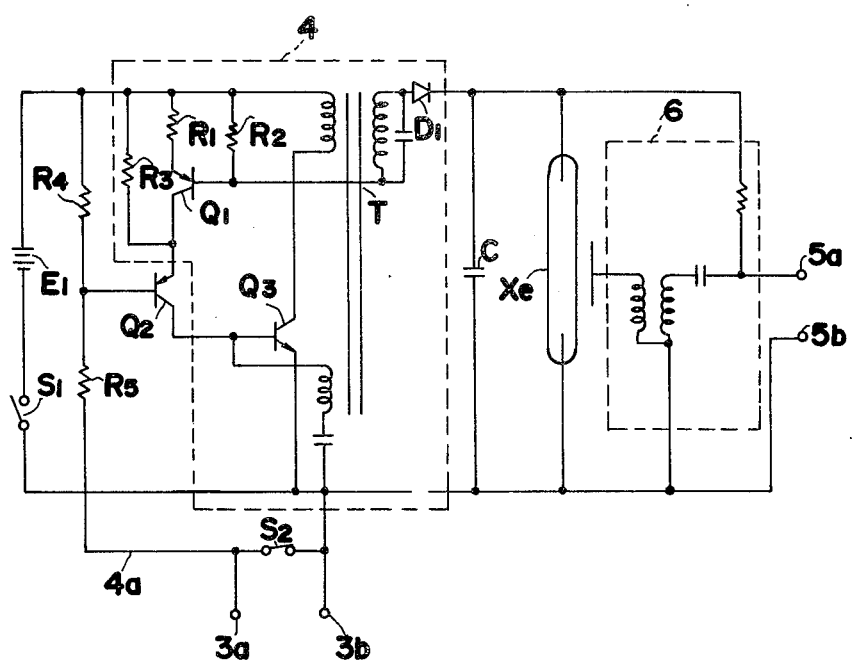
FIG. 2 is a circuit diagram showing an exemplary circuit of an electronic flash device to which the present invention is applied.

With reference to FIG. 2 showing an exemplary definite circuit of electronic flash device 2 employed in the present invention, the circuit composed of resistors R1, R2 and R3 and transistor Q1 in voltage booster converter circuit 4 enclosed by a broken line, supplies to the base of oscillation transistor Q3 a current proportional to the current flowing through the secondary winding of transformer T. Between the circuit and the base of oscillation transistor Q3 is interposed control transistor Q2 which is adapted to control voltage booster converter circuit 4 to make the latter operative and inoperative. The base of transistor Q2 is connected to the node between resistors R4 and R5 to be applied with a fraction of the divided voltages of DC power source E1 through power switch S1 and normally closed switch S2. Both end terminals of normally closed switch S2 are opened by a mechanism as shown in FIG. 3 when electronic flash device 2 is electrically connected with release control device 14.

Figure 3:
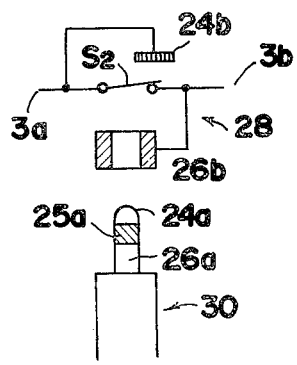
FIG. 3 is a schematic illustration of the relevant portion of the electronic flash device.

With reference to FIG. 3, receptacle 28 is mounted at terminal section 3 of electronic flash device 2, while plug 30 is provided at terminal section 15 of release control device 14. Plug 30 is formed with first conductive portion 24a at the tip of a cylindrical projection, and second conductive portion 26a at the root of the projection being spaced by insulating portion 25a from first conductive portion 24a. On the other hand, in receptacle 28, first conductive portion 24b and second conductive portion 26b are kept electrically connected with each other via normally closed switch S2 when plug 30 is not coupled to receptacle 28. When plug 30 is inserted into receptacle 28, first conductive portion 24a at the tip of plug 30, at first, engages the movable contact of normally closed switch S2 to push it against its elasticity and open switch S2. When plug 30 is advanced further to make the movable contact engage first conductive portion 24b, second conductive portion 26a of plug 30 is in contact with and is electrically connected with second conductive portion 26b of the receptacle.

The following description is of the operation of the present invention, with emphasis on the operation of the electronic flash device. In the case of photography using electronic flash device 2 only without using release control device 14, as switch S2 is closed, closure of switch S1 will cause the base current to be supplied through resistors R4 and R5 to the base of transistor Q2 and cause it to conduct. At this time, the current flowing through resistor R5 is as small as several milliamperes at the most. By the condition of transistor Q2, transistor Q3 is supplied with current to its base and starts its well-known oscillating operation. With the oscillation of transistor Q3, high voltage oscillation pulses are generated at the secondary winding of transformer T and the high voltage charges main capacitor C through diode D1. After the charged voltage of main capacitor C has reached a voltage sufficient for the firing of flash tube Xe, a manually operable release switch 13 of camera 8 is closed causing electromagnetic release circuit 10 to effect the shutter release operation. When synchronous switch Sy is closed upon full opening of the shutter, a trigger signal generated thereby is applied through terminal sections 9 and 5 to trigger circuit 6 of the electronic flash device to fire flash tube Xe and effect flash photography.

Next, an explanation will be given about photography where the operations of electronic flash device 2 and camera 8 are automatically controlled by release control device 14. When plug 30 of release control device 14 is inserted into and connected to receptacle 28 of electronic flash device 2, switch S2 is opened with terminal sections 3 and 15 being electrically connected with each other. Accordingly, closure of power switch S1 only will not effect the current supply to the base of transistor Q2 whereby transistors Q1, Q2 and Q3 are all blocked and voltage booster circuit 4 is inoperative with no current flowing from power source E1 and current consumption being zero. For periodic photographing with camera 8, the timing of operations such as times or hours for photographing or the period of photographing, should be set in actuation timing setting circuit 16 of release control device 14. In response to the closure of switch 19, timer control circuit 18 starts its operation to generate first and second actuation signals at respective terminals 18c and 18b in accordance with the set timing. One minute before the time of camera actuation, from output terminal 18b is generated a continuous "High" level signal as the second signal for commanding the preparation for flash photography to cause transistor 20 to conduct. The signal due to the conduction of transistor 20, is applied through terminal sections 15 and 3 to voltage booster circuit 4 of electronic flash device 2. Transistor Q2 conducts, being supplied with its base current through resistors R4 and R5, transistor 20 and terminal sections 3 and 15. With the conduction of transistor Q2, transistor Q3 starts oscillation to effect charging of main capacitor C. At the time of camera operation, main capacitor C has been charged to a sufficient level for the firing of flash tube Xe. Also at the time of camera actuation, a "High" level pulse signal as the first signal for actuating or releasing the camera is generated at output terminal 18c of timer control circuit 18 and makes transistor 22 conductive for a short time. The signal due to the conduction of transistor 22 is supplied through terminal sections 17 and 11 to electromagnetic release circuit 10 of camera 8 to effect a shutter release operation. When synchronous switch Sy is closed upon full opening of the shutter, trigger circuit 6 of electronic flash device 2 is actuated to effect firing of flash tube Xe. After a lapse of a given time, the shutter of camera 8 is closed to terminate an exposure. One minute after the time of camera actuation, the potential at output terminal 18b of timer control circuit 18 inverts to a "Low" level to block transistor 20, whereby transistors Q2 and Q3 of voltage booster converter circuit 4 in electronic flash device 2 are blocked to stop the operation of voltage booster converter circuit 4. The above operation control of electronic flash device 2 and camera 8 by release control device 14 is effected at every time set in actuation timing setting circuit 16.

In place of controlling the operative and inoperative conditions of the voltage booster converter circuit within the electronic flash device, the release control device may be arranged to control the operative and inoperative conditions of an external power source which is detachably attached to the electronic flash device for shortening the period of time required for completion of the charging of the main capacitor and which has a voltage booster converter circuit of a construction similar to that of the voltage booster converter circuit of FIG. 2.

Figure 4:
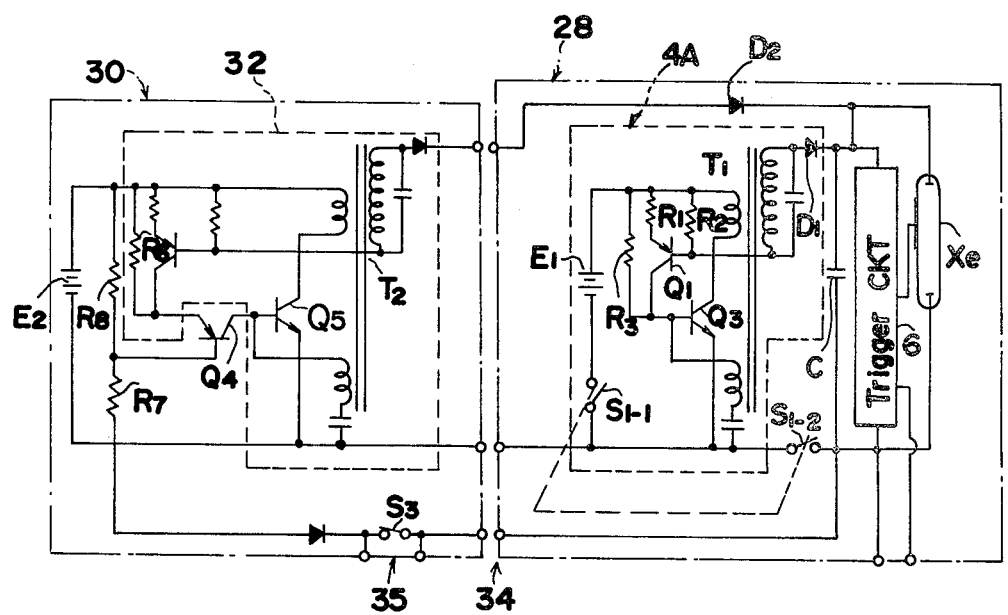
FIG. 4 is a circuit diagram showing another exemplary circuit of an electronic flash device.

FIG. 4 shows the interrelationship between the external power source and the electronic flash device. In the Figure, external power source 30 includes DC power source E2, voltage booster converter circuit 32, terminal section 34 for the connection with electronic flash device 28, and terminal section 35 for the connection with release control device 14. The high voltages respectively boosted by voltage booster circuit 4A of electronic flash device 28 and voltage booster circuit 32 of external power source 30, charge main capacitor C through diodes D1 and D2, respectively. Transistor Q4 of external power source 30 corresponds to transistor Q2 of the above described first embodiment. The base current of transistor Q4 flows through resistors R6 and R7, normally closed switch S3, terminal section 34 and switch S1-2 of electronic flash device 28 whereby transistor Q4 can not conduct when switch S1-2 is made open in being interlocked with power switch S1-1 of the electronic flash device. When release control device 14 is coupled to external power source 30, switch S3 is opened as it is similar to switch S2 of the above described first embodiment and terminal sections 15 and 35 are electrically connected to each other whereby conduction of transistor 20 makes transistor Q4 conductive for the oscillation of transistor Q5. Resistor R8 constitutes a voltage divider together with resistor R7.

Although a continuous second signal effects the charging of the main capacitor in the electronic flash device in the aforementioned embodiments, instead, the circuits may be modified so that the second signal is generated for a short time as a pulse signal a given time before the time of camera actuation and that a circuit such as a one-shot circuit responds to the pulse signal to energize the electronic flash device for a desired period.

Obviously many modifications and variations of the present invention are possible in the light of the above teachings. It is therefore to be understood that within the scope of the appended claims the invention may be practiced otherwise than as specifically described.

What is claimed is:

1. A control device for use with a camera having an electromagnetic camera release means and an electronic flash device including a battery cell, a flash tube, a main capacitor storing electricity for firing said flash tube and a voltage booster converter circuit with an oscillation transistor and a semiconductive switching element switchable to effect current supply to the base of said oscillation transistor for raising the voltage of said battery cell by the oscillation of said oscillation transistor to generate a high voltage applied to said main capacitor for the charging thereof, said control device comprising:

actuation timing setting means for manually setting timed actuations of said camera;

timer control means for generating a first signal at each said timed actuations and for generating a second signal a given period of time before each said timed actuations;

first signal applying means for applying said first signal to said electromagnetic camera release means for the actuation thereof; and second signal applying means for applying said second signal to said semiconductive switching element for the switching thereof to effect the current supply to the base of said oscillation transistor.

2. A control device as defined in claim 1, further comprising a switch manually switchable for actuating said timer control means.

3. A control device as defined in claim 1, wherein said first signal applying means includes a second semiconductive switching element switched in response to said first signal to actuate said electromagnetic camera release means, and said second signal applying means includes a third semiconductive switching element switched in response to said second signal for the switching of said semiconductive switching element of said voltage booster converter circuit to effect the current supply to the base of said oscillation transistor.

4. A control device as defined in claim 1, wherein said timer control means is adapted to stop generating said second signal a given period of time after each said timed actuations.

5. A control device as defined in claim 1, further comprising a terminal section through which said second signal is applied to said semiconductive switching element of said voltage booster converter circuit of said electronic flash device.

6. A combination for periodic flash photographing, comprising:

a camera comprising:
an electromagnetic camera release means and
a synchronous switch switched in synchronism with full shutter opening;

an electronic flash device comprising:
a battery cell,
a flash tube,
a trigger circuit for firing said flash tube in response to the switching of said synchronous switch,
a main capacitor storing electricity for firing said flash tube and
a voltage booster converter circuit having an oscillation transistor and a semiconductive switching element switchable to effect current supply to the base of said oscillation transistor, said voltage booster converter circuit raising the voltage of said battery cell by the oscillation of said oscillation transistor to generate a high voltage applied to said main capacitor for the charging thereof; and a control device comprising:
actuation timing setting means for manually setting timed actuations of said camera for periodic photographing; and
timer control means for generating at each said timed actuations a first signal applied to said electromagnetic camera release means for the actuation thereof and for generating at a given period of time before each said timed actuations a second signal applied to said semiconductive switching element for the switching thereof to effect the current supply to the base of said oscillation transistor, said given period of time being determined such that said electronic flash device is conditioned for firing in advance of the generation of said first signal.

7. A combination as defined in claim 6, wherein said camera, said electronic flash device and said control device are provided separately from one another, and wherein said camera and said control device have electrically connectable terminal sections for transmitting said first signal, said electronic flash device and said control device have electrically connectable terminal sections for transmitting said second signal, and said camera and said electronic flash device have electrically connectable terminal sections which transmit the condition of the switching of said synchronous switch to said trigger circuit.

8. A combination as defined in claim 7, wherein said electronic flash device further includes a normally closed switch the closure of which causes the switching of said semiconductive switching element for providing the power supply to the base of said oscillation transistor, and wherein said control device further includes means for opening said normally closed switch upon the establishment of the electric connection between said electronic flash device and said control device.

9. A combination as defined in claim 7, wherein said control device further includes a switch manually switchable for actuating said timer control means.

10. A combination as defined in claim 7, wherein said camera further includes a switch manually switchable for actuating said electromagnetic camera release means.

11. A combination as defined in claim 6, wherein said timer control means is adapted to stop generating said second signal a given period of time after each said timed actuations.

12. A control device for use with a camera having an electromagnetic camera release means, an electronic flash device including, a flash tube and a main capacitor for storing electricity for firing said flash tube, and an external power source for said electronic flash device including a battery cell and a voltage booster converter circuit having an oscillation transistor and a semiconductive switching element switchable to effect current supply to the base of said oscillation transistor and which raises the voltage of said battery cell by the oscillation of said oscillation transistor to generate a high voltage applied to said main capacitor for the charging thereof, said control device comprising:

actuation timing setting means for manually setting timed actuations of said camera; and timer control means for generating a first signal at each said timed actuations and for generating a second signal at a given period of time before each said timed actuations;

a first signal applying means for applying said first signal to said electromagnetic camera release means for the actuation thereof; and a second signal applying means for applying said second signal to said semiconductive switching element for the switching thereof to effect the current supply to the base of said oscillation transistor, said given period of time being determined such that said electronic flash device is conditioned for firing in advance of the generation of said first signal.

13. A control device as defined in claim 12, further comprising a switch manually switchable for actuating said timer control means.

14. A control device as defined in claim 12, wherein said first signal applying means includes a second semiconductive switching element switched in response to said first signal to actuate said electromagnetic camera release means, and said second signal applying means includes a third semiconductive switching element switched in response to said second signal for the switching of said semiconductive switching element of said voltage booster converter circuit to effect the current supply to the base of said oscillation transistor.

15. A control device as defined in claim 12, wherein said timer control means is adapted to stop generating said second signal a given period of time after said timed actuations.

16. A control device as defined in claim 12, further comprising a terminal section through which said second signal is applied to said semiconductive switching element of said voltage booster converter circuit of said external power source.

17. A combination for periodic flash photographing, comprising:
a camera automatically capable of repeated photographing comprising:
an electromagnetic camera release means and
a synchronous switch switched in synchronism with full shutter opening;
an electronic flash device comprising:
a flash tube,
a trigger circuit for firing said flash tube in response to the switching of said synchronous switch, and
a main capacitor storing electricity for firing said flash tube;
an external power source for said electronic flash device, comprising:
a battery cell, and
a voltage booster converter circuit having an oscillation transistor and a semiconductive switching element switchable to effect current supply to the base of said oscillation transistor, said voltage booster converter circuit raising the voltage of said battery cell by the oscillation of said oscillation transistor to generate a high voltage applied to said main capacitor of said electronic flash device for the charging thereof; and
a control device comprising:
actuation timing setting means for manually setting timed actuations of said camera for periodic photographing; and
timer control means for generating at said timed actuations a first signal applied to said electromagnetic camera release means for the actuation thereof and for generating a given period of time before said timed actuations a second signal applied to said semiconductive switching element for the switching thereof to effect the current supply to the base of said oscillation transistor, said given period of time being determined such that said electronic flash device is conditioned for firing in advance of the generation of said first signal.

18. A combination as defined in claim 17, wherein said camera, said electronic flash device, said external power source and said control device are provided separately from one another, and wherein said camera and said control device have electrically connectable terminal sections for transmitting said first signal, said control device and said external power source have electrically connectable terminal sections for transmitting said second signal, said camera and said electronic flash device have electrically connectable terminal sections which transmit the switching of said synchronous switch to said trigger circuit, and said external power source and said electronic flash device have electrically connectable terminal sections which transmit the high voltage generated by said booster circuit to said main capacitor.

19. A combination as defined in claim 18, wherein said external power source further includes a normally closed switch the closure of which causes the switching of said semiconductive element for providing the current supply to the base of said oscillation transistor, said switch being adapted to be opened upon the establishment of the electric connection between said external power source and said control device.

20. A combination as defined in claim 17, wherein said control device further includes a switch manually switchable for actuating said timer control means.

21. A combination as defined in claim 17, wherein said timer control means is adapted to stop generating said second signal a given period of time after said timed actuations.

22. A combination as defined in claim 19, wherein said electronic flash device further includes a battery cell, a power switch, a voltage booster converter circuit which raises the voltage of said battery cell of said electronic flash device to generate a high voltage applied to said main capacitor for the charging thereof, and a switch interlocked with said power switch to be opened upon opening of said power switch and arranged to interrupt the current supply to the base of said oscillation transistor of said voltage booster converter circuit of said external power source by the opening thereof even when said switch of said external power source remains closed.

* * * * *